F. I. DERBY.
FEED MIXER.
APPLICATION FILED MAY 28, 1910.
986,553.
Patented Mar. 14, 1911.
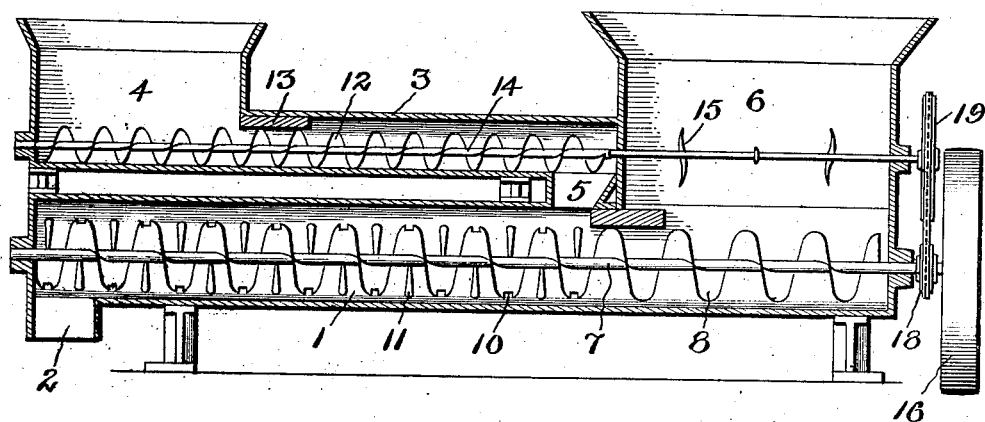
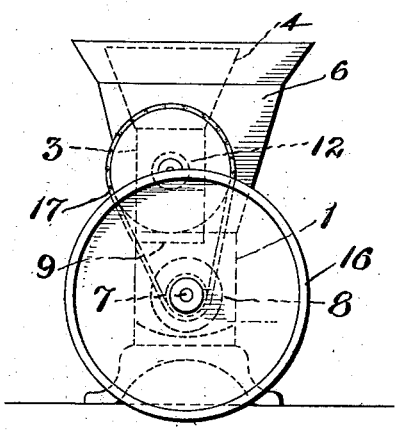
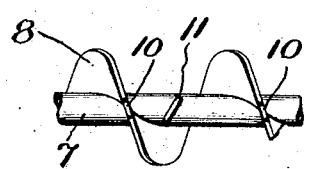
Witnesses
E. G. Marshall
C. B. Bull
Inventor
F. I. Derby
By John H. Holt
his Attorney

UNITED STATES PATENT OFFICE

FRANK I. DERBY, OF GASTON, ALABAMA.

FEED-MIXER.

986,553.

Specification of Letters-Patent. Patented Mar. 14, 1911.

Application filed May 28, 1910. Serial No. 563,991.

*To all whom it may concern:*

Be it known that I, FRANK I. DERBY, a citizen of the United States of America, residing at Gaston, in the county of Sumter and State of Alabama, have invented certain new and useful Improvements in Feed-Mixers, of which the following is a specification.

My present invention relates to improvements in mixing machines and more especially to those adapted for the mixing of feed, and it has for its object primarily to provide an improved mixing machine of this character which is capable of receiving in bulk the different materials to be mixed, and feeding such materials in predetermined proportions to a combined mixing and discharge conveyer, such conveyer in the preferred embodiment of the invention being of the screw or worm type and having its flights notched and also being equipped with intervening blades or paddles which have a reverse pitch with respect to the pitch of the conveyer flights, whereby the different materials are not only advanced by such conveyer, but they are subjected during such advancing movement to a thorough mixing action.

Another object of the invention is to provide a novel arrangement for the operating elements whereby a compact structure is obtained and to form a feed section upon the mixing conveyer to feed one of the materials thereto, and to provide a second conveyer for feeding another kind of material, the second conveyer having its shaft extended and equipped with agitators which serve to prevent bridging or banking of the material which is fed to the feed section of the mixing conveyer.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 represents a central vertical section of a mixing machine constructed in accordance with my invention; Fig. 2 is an end elevation of the machine as viewed from the right in Fig. 1; and Fig. 3 is a detail view of a section of the mixing conveyer.

Similar parts are designated by the same reference characters in the several views.

My present invention provides a mixing machine which is capable of use generally in mixing in predetermined proportions, materials of different kinds, although the form shown in the present instance may be used to especial advantage in mixing relatively coarse and fine feeds, such for example as meal and cotton seed hulls or products.

In that form of the invention shown in the accompanying drawing, the machine comprises a suitable casing or housing, the lower portion of which forms a combined feed and mixing and discharge trough 1 having a discharge opening 2, and the upper portion of the casing forms a relatively smaller feed trough 3 having a supply hopper 4 at its forward end and a discharge opening 5 at or adjacent to its discharge end.

The lower trough 1 is provided, beyond the discharge opening 5 for the upper trough, with a supply hopper 6 which is preferably of a greater capacity than the hopper 4 and is adapted to receive the coarser material.

The lower trough 1 which serves to feed the coarser material and to mix such coarser material with the finer material, such as meal, and discharge the mixed materials, contains a conveyer which is of the screw or worm type, its shaft 7 being suitably journaled in the opposite closed ends of the trough and the flights 8 operate within the trough and serve to advance the material longitudinally thereof. That portion of this conveyer which is located in the bottom of the hopper 6 is preferably plain and serves as a feed section for advancing the material from this hopper to the mixing portion of the trough. A check-board 9 is preferably placed in the trough 1 at the point where this trough joins the bottom of the hopper 6 for the purpose of insuring a proper entrance of the material from the hopper 6 to the mixing portion of the trough 1.

That portion of the trough 1 between the check-board and the outlet 2 serves as a mixing chamber, and in order to insure a thorough mixing action, I provide the peripheral portions of the flights 8 with notches 10 and I also provide a corresponding number of blades or paddles 11, the latter projecting radially from the shaft 7 of the conveyer at points opposite to the notches 10 so as to act on the material passing through these notches, and these blades or paddles preferably have a reverse pitch with respect to that of the flights in order to slightly retard the flow of the materials and thereby prevent their discharge without thoroughly mixing.

The upper trough 3 contains a feed conveyer 12 which serves to conduct the relatively fine material such as meal, from the hopper 4 to the outlet or discharge 5, a check-board 13 being preferably fitted in this upper trough at the point where it joins the hopper 4. This upper conveyer may be relatively smaller than the lower conveyer owing to the fact that it handles a smaller quantity of material, and in order that this upper conveyer may feed the material in a reverse direction to the feed of the lower conveyer, its flights have an opposite pitch. The shaft 14 of the upper conveyer is extended through the hopper and carries agitating arms 15 which serve to prevent bridging of the coarser material therein.

Any suitable means may be employed for revolving the conveyers at proper relative speeds to secure the desired mixture of the materials. In the present instance, a driving pulley 16 is fixed to the shaft 7 of the lower and larger conveyer, and a chain 17 operatively connects sprocket wheels 18 and 19 on the respective conveyer shafts, whereby a predetermined ratio of speed is insured. Obviously, by changing these sprocket wheels, any desired ratio of speed between the conveyers may be obtained, and the proportions of the materials may be correspondingly varied.

In operation, the materials to be mixed are dumped into the hoppers 4 and 6, and operation of the conveyers will cause the conveyer 12 to supply material from the upper trough to the lower trough through the opening 5, while the plain section of the lower conveyer will conduct material from the hopper 6 past the check-board 9 and into the mixing portion of the lower trough where it meets the material supplied through the opening 5. The two materials while within the mixing portion of the lower trough are subjected simultaneously to a thorough mixing action and to an advancing movement, the mixed material being discharged from the machine through the opening 2.

It will be observed that the flights of conveyer 8 are not notched and the paddles 11 are omitted along that portion of the conveyer to the right (Fig. 1) of the discharge opening 5. This is on account of the fact that said conveyer does not perform any mixing function along said portion.

I claim as my invention:

1. In a mixing machine, the combination of a suitable casing forming a trough, and a screw or worm conveyer operative in the trough, the conveyer having peripheral portions of its flights notched and carrying blades or paddles positioned opposite to the notched portions.

2. In a mixing machine, the combination of a suitable trough, and a screw conveyer operative therein and having notches formed in the peripheral edges of its flights, and carrying a set of radially projecting blades located opposite to said notches and having a reverse pitch with respect to that of the conveyer flights.

3. In a mixing machine, the combination of a casing forming a trough having a discharge opening toward one end and a supply hopper toward its opposite end, and also having means for supplying material thereto at an intermediate point, and a conveyer mounted to operate in said trough, the portion of the conveyer adjacent to the hopper serving to feed material therefrom, and the portion of the conveyer between the hopper and the discharge opening being provided with mixing devices.

4. In a mixing machine, the combination of a casing forming a pair of superposed troughs, the lower trough having a supply hopper at one end, an outlet at its opposite end, and an opening communicating therewith at an intermediate point, the upper trough having one end to discharge into said intermediate opening in the lower trough and provided at its opposite end with a supply hopper, a conveyer operative in the upper trough and having a revoluble shaft extending into the hopper for the lower trough and provided with agitating devices, and a conveyer mounted to operate in the lower trough and having a feed portion arranged in the bottom of the supply hopper for the lower trough and also having a mixing portion operative in the lower trough between the intermediate opening and its outlet.

In testimony whereof I affix my signature in presence of two witnesses.

FRANK I. DERBY.

Witnesses:
F. E. COBB,
W. J. McCAIN.